Figure 1:
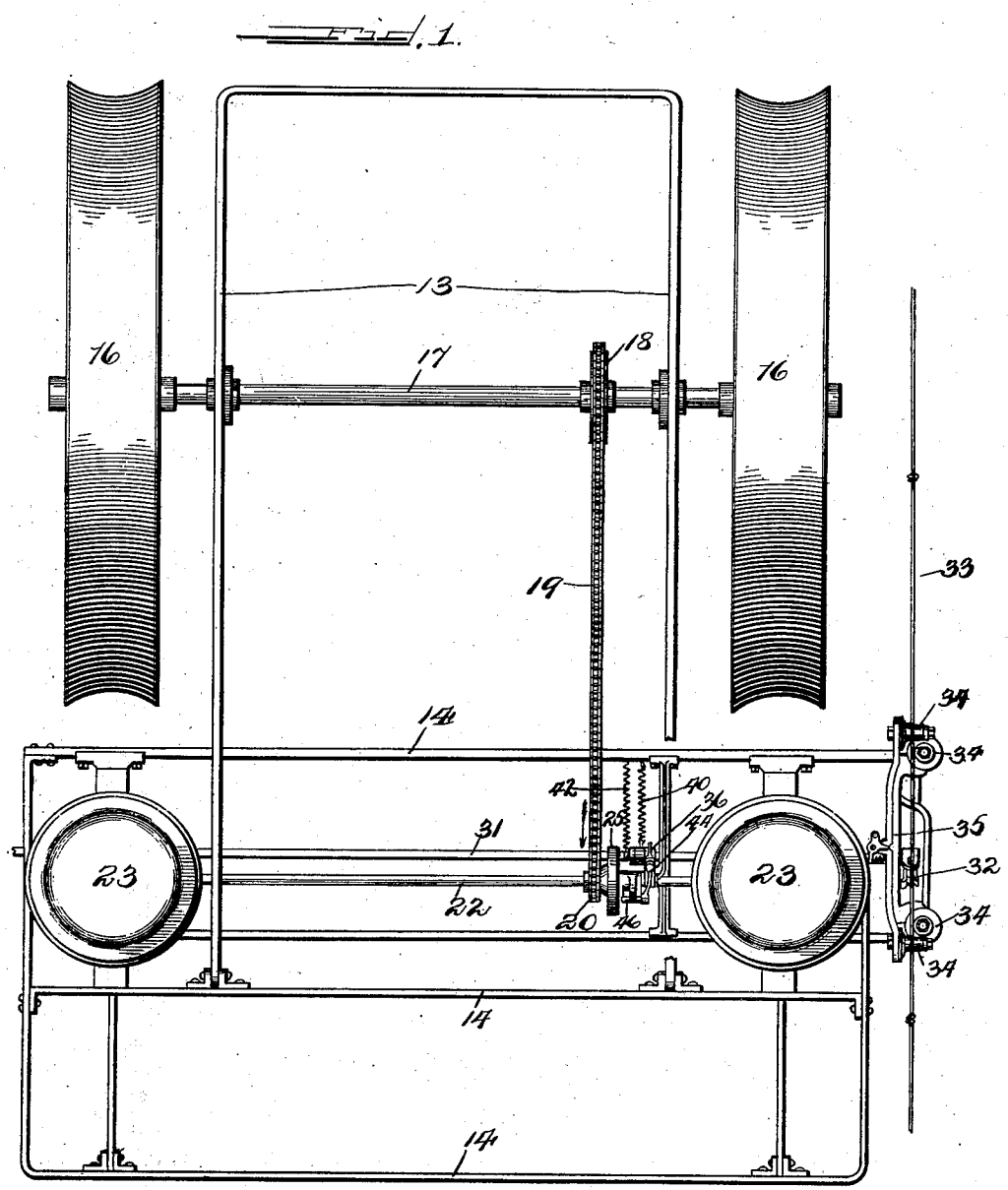

No. 687,352. Patented Nov. 26, 1901.
J. C. TUNNICLIFF.
CORN PLANTER.
(Application filed June 17, 1901.)
(No Model.) 3 Sheets—Sheet 1.

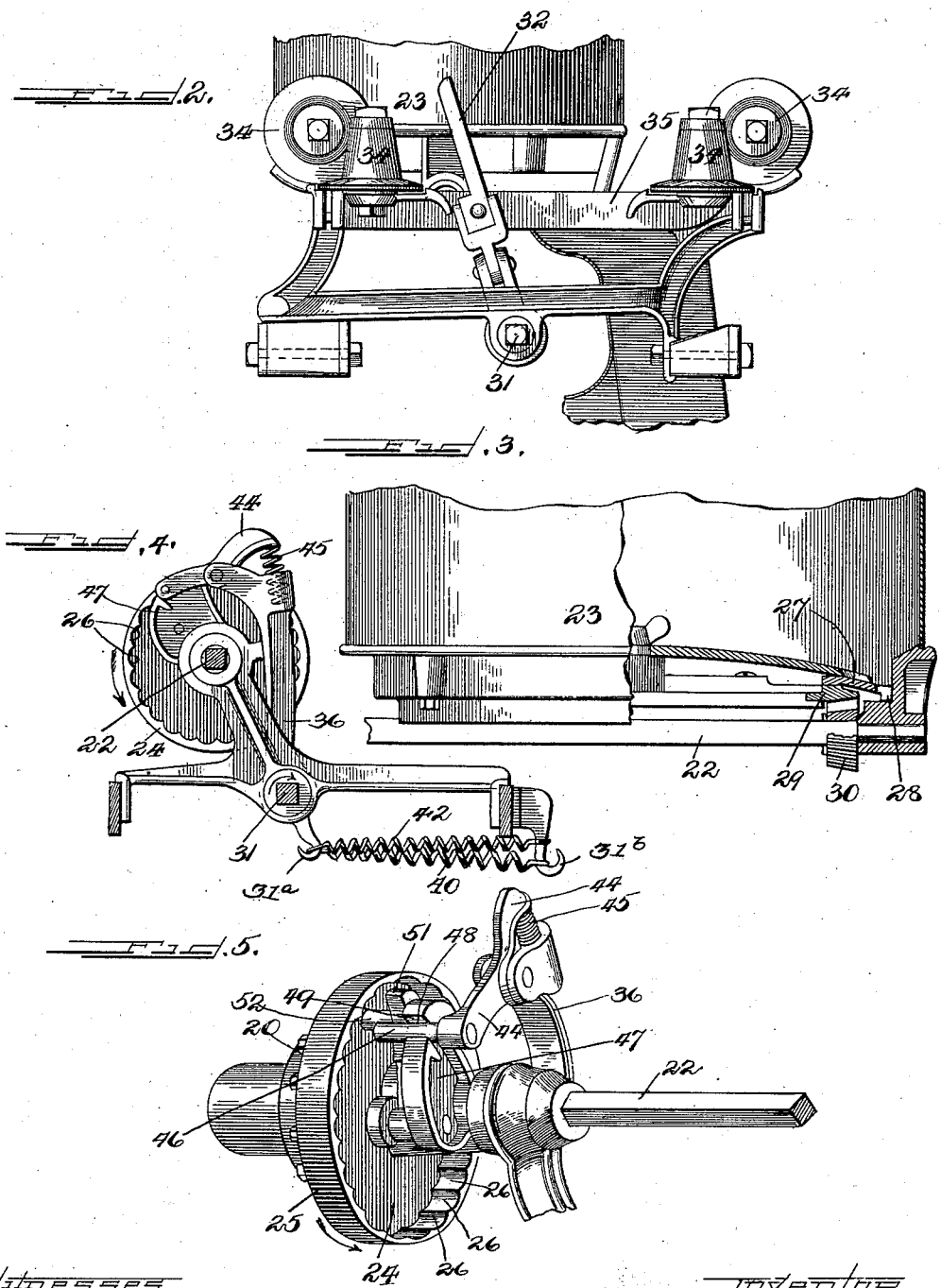

No. 687,352. Patented Nov. 26, 1901.
J. C. TUNNICLIFF.
CORN PLANTER.
(Application filed June 17, 1901.)
(No Model.) 3 Sheets—Sheet 3.
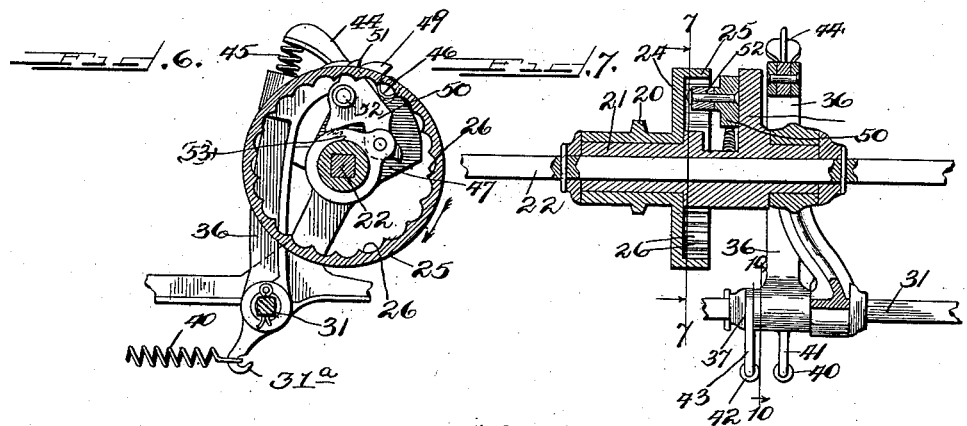
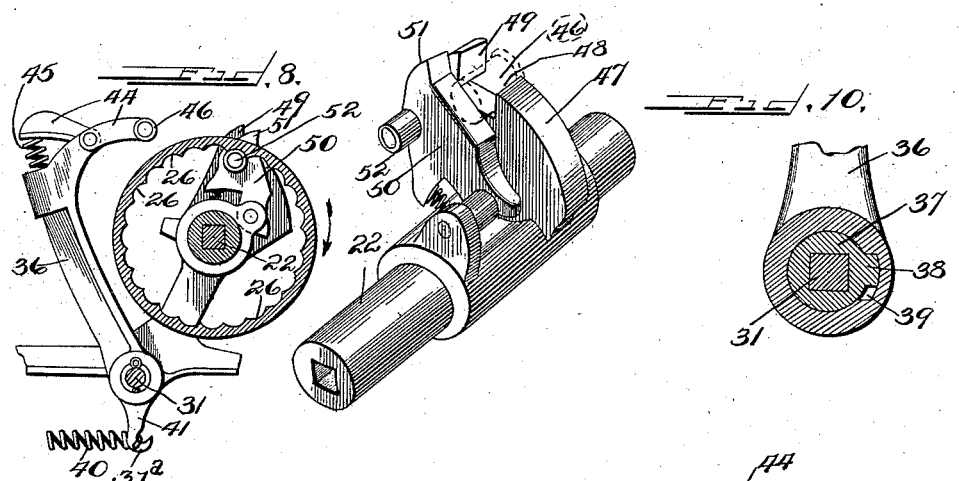
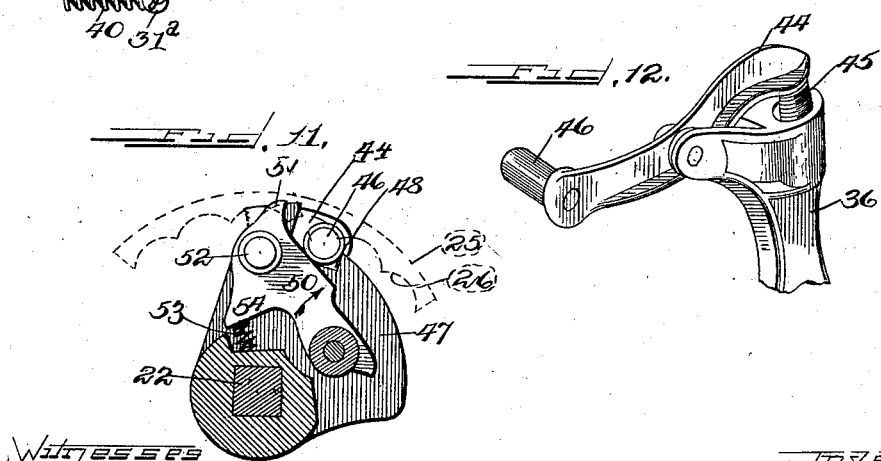

UNITED STATES PATENT OFFICE.

JOHN C. TUNNICLIFF, OF MOLINE, ILLINOIS, ASSIGNOR TO D. M. SECHLER CARRIAGE COMPANY, OF MOLINE, ILLINOIS, A CORPORATION OF ILLINOIS.

CORN-PLANTER.

SPECIFICATION forming part of Letters Patent No. 687,352, dated November 26, 1901.

Application filed June 17, 1901. Serial No. 64,781. (No model.)

*To all whom it may concern:*

Be it known that I, JOHN C. TUNNICLIFF, a citizen of the United States, residing at Moline, in the county of Rock Island and State of Illinois, have invented certain new and useful Improvements in Seeding Devices for Corn-Planters, of which the following is a specification, reference being had to the accompanying drawings.

My invention relates to corn-planters, and particularly to seeding devices in such corn-planters; and its object is to provide mechanism by which accurate dropping of the seed may be insured, and particularly to prevent injury to grains of corn when passing under the usual cut-off in the seedboxes of such corn-planters. As is well known, a portion of the seeding mechanism of corn-planters consists of a hopper adapted to be filled with corn, in the bottom of which hopper is located a rotating seed-plate provided with seed-cups adapted to receive one or more grains of corn and to carry them around as the seed-plate is rotated, dropping them through any suitable tube and thence by means of suitable valve devices into the ground behind a runner which plows a furrow for the reception of the seed. Just before the cups containing the seed pass over the opening into the seed-tube, as is well known, they pass below a cut-off device, which is designed to prevent any grains of corn except those contained in the seed-cup from passing under the cut-off and thence being dropped into the seed-tube, in order that a definite charge of corn may be delivered to the ground as the seed-cup rotates. It frequently happens with the ordinary planter that grains of corn do not settle down into the seed-cups and that therefore one or more of the grains in the seed-cup which are intended to be carried by the rotation of the seed-plate below the cut-off and thence dropped into the seed-tube projects above the surface of the seed-plate in such a way that as the seed-plate, with the cup containing the grains, passes beneath the cut-off the germ part of the grain is sheared off by the action of the cut-off, rendering the grain of corn with its germ so sheared off of course unfertile. As it is particularly desirable to have a definite number of grains deposited where the planter is used as a drill or a hill drop planter, this becomes an objection, as it is obvious that the grain of corn so sheared off would not grow, but would be wasted, producing irregularity of the crop. In order to relieve the work which would otherwise have to be done by the check-rower wire devices, which would otherwise have to operate not only the runner-valves, but also the seed-plate and accompanying mechanism, corn-planters have been devised in which the seed-plates were driven by means of sprocket-wheels and chains from the wheels on the rear frame of the planter, and the check-rower mechanism therefore operated only the runner-valves. As difficulties, however, arose in the operation of such planters from the slippage of the wheels, irregularity of the ground, and other causes, whereby the seed-plates were not accurately rotated so as to feed the same amount of corn as they rotated, thereby causing inaccuracy of the charges of seed dropped, corn-planters have been devised in which a clutch member loosely mounted upon a shaft, geared when said shaft was rotated to rotate the seed-plates, was connected by sprocket-chains with the wheels of the planter, so that the clutch was continually rotated, and devices were placed upon the machine and connected with the check-rower devices, so that when said check-rower devices were contacted by the usual knotted wire with each throw of such check-rower devices the clutch member was engaged, so as to give the shaft one complete rotation, and thereby by suitable gearing give to the seed-plate such rotation as might be desired to feed the given number of grains into the runner and runner-valves. Upon such complete rotation of the shaft the clutch members disengaged automatically, so that the seed-plate-driving shaft would remain stationary until the next throw of the check-rower mechanism, thereby insuring a proper amount of rotation to the seed-plate regardless of irregularities in the ground and slippage of the wheels. If, however, for any reason the seed-cups of the seed-plate in such machines were not all filled when they passed under the usual cut-off, it is obvious that the proper number of grains of corn would not be deposited and irregularities in seeding would arise.

It is the object of my invention to improve the class of planters last above described and to insure the deposit of a single grain or proper number of grains into each seed-cup and also to guard against the grains of corn projecting above the seed-cups as they pass under the cut-off, thereby causing the shearing of the grain or grains of corn by the cut-off, as above set forth.

That which I regard as new will be set forth in the claims.

In the drawings, Figure 1 is a plan view of a corn-planter. Fig. 2 is an enlarged detail, being a side elevation of one of the seed-boxes, showing the check-rower mechanism. Fig. 3 is an enlarged detail of a portion of the seedbox, one side of the seedbox being partly cut away and partly in vertical section. Fig. 4 is an enlarged detail, being a side view of the clutch mechanism by which the seed-plate is set in rotation. Fig. 5 is an enlarged detail, being a perspective view of the same parts as Fig. 4. Fig. 6 is an enlarged detail view, being a section on line 7 7 of Fig. 7. Fig. 7 is an enlarged detail view, being a longitudinal section of the clutch and reversing mechanism. Fig. 8 is an enlarged detail, being a view of the same parts shown in Fig. 6, with the clutch mechanism in its engaging position. Fig. 9 is an enlarged detail, being a perspective view of the clutch mechanism. Fig. 10 is an enlarged detail of the lower end of the clutch-operating lever, partly in section, showing the devices by which it is secured to its shaft. Fig. 11 is an enlarged detail, being a view of the clutch mechanism with the clutch-wheel removed and indicated in part in dotted lines; and Fig. 12 is an enlarged detail, being a view of the upper end of the clutch-operating lever.

13 indicates the rear or wheel frame of a planter, and 14 the front or runner frame. The rear frame carries the usual wheels 16, mounted upon an axle 17, which is journaled in the frame 13 in the usual manner. The front frame 14 carries the seeding mechanism, hereinafter described.

18 indicates a sprocket-wheel which is keyed or otherwise secured to the axle 17 and carries a sprocket-chain 19.

20 indicates a sprocket-wheel which is rotatably mounted upon a bearing 21, which is secured to a shaft 22. The shaft 22 is journaled in the front frame 14 of the corn-planter and extends below the seedboxes 23. The sprocket-chain 19 connects the sprocket-wheels 18 and 20, so that as the planter is driven forward the sprocket-chain 19 is rotated by the rotation of the wheel 16.

24 indicates a wheel or disk which is preferably formed integral with the sprocket-wheel 20, but may be rigidly secured thereto in any appropriate manner. The wheel or disk 24 is provided with a flange 25, the inner surface of which is provided with a number of notches 26. The wheel or disk 24 forms one member of a clutch mechanism, the other member being hereinafter described.

Referring particularly to Fig. 3, 27 indicates a seed-plate provided with seed-cups 28. The seed-plate 27 may be of any approved form and construction and may contain seed-cups adapted to receive one grain of corn at a time or several grains, as may be desired, and operates in the well-known and usual manner. The seed-plate 27 rests upon and engages a ring 29, which is provided with gear-teeth in its lower surface and engages with the seed-plate 27 in any well-known and approved way, so that when the ring 29 is rotated the seed-plate 27 is rotated with it.

30 indicates a gear-wheel which is keyed or otherwise secured to the shaft 22 and meshes with the gear-teeth of the ring 29, so that when the shaft 22 is rotated, as hereinafter described, the ring 29 is carried around with it, rotating the seed-plate 27.

31 indicates a rock-shaft which is journaled in the front frame 14 below the seedboxes 23, as is best shown in Figs. 1 and 2.

32 indicates a forked lever of any well-known form and description, which is secured to the rock-shaft 31 and is operated in the well-known way by a knotted cord or wire 33, passing between guiding-sheaves 34, supported upon a bracket 35. As the forked lever is contacted by the tappets upon the check-rower wire 33, it is operated in the well-known way to rock the shaft 31 and to operate the ordinary seed-valves in the runners, which may be of any approved form and construction, and forming no part of my invention are therefore not shown.

It will of course be understood that the forked-lever attachments, brackets, and sheaves are upon each side of the machine; but for purposes of convenience they are shown upon only one side in Fig. 1, being broken away upon the other. They of course operate in the same well-known way.

36 indicates a lever which is mounted on a bearing 37. The bearing 37 is mounted on the inner portion of the rock-shaft 31, as is best shown in Fig. 10, and engages the lever 36 by means of a lug 38 upon said bearing 37, operating within a recess 39 at the lower end of the lever 36, as is best shown in Fig. 10.

40 indicates a spiral contraction-spring, one end of which is connected to a hook 31$^a$ upon the lower end of the lever 36 and the other end to the hook 31$^b$, connected to the rear cross-bar of the front frame of the machine, as is best shown in Figs. 1 and 4, and operates to normally force the lever forward in the position shown in Figs. 4, 5, and 2.

42 indicates a contraction-spring one end of which is secured to an arm 43, projecting downward from the bearing 37, and the other end is secured to the hook 31$^b$, connected to the rear cross-bar of the front frame of the machine, as is best shown in Figs. 1 and 4. The spring 42 normally holds the parts in the position shown in Figs. 4, 5, and 7, and also operates to return the rock-shaft 31 and forked lever 32 to the normal position shown in Fig. 2 after the throw of the lever 32 by the operation of the check-rower wire 33.

44 indicates a lever which is pivotally mounted in the upper end of the lever 36.

45 indicates an expansion-spring which bears upon the top of the lever 36 and upon the under side of the lever 44, tending to force the arm of the lever 44 upon which it bears upward and the other arm downward.

46 indicates a pin which is mounted upon the outer end of the lever 44—that is to say, upon the end opposite to that engaged by the spring 45.

47 indicates a plate which is secured upon the shaft 22, either by being mounted on the squared portion of the shaft, as shown in the drawings, or keyed thereto or in any other appropriate way, so as to rotate when said shaft 22 is rotated. The plate 47 is provided with a notch 48 and a projecting lug 49, preferably formed integral with said plate. The notch 48 is of suitable size and shape to be engaged by the pin 46 in the manner hereinafter described and is normally in such engagement, (best shown in Figs. 9 and 11,) except when operated as hereinafter described.

50 indicates a dog which is pivoted upon the side of the plate 47 facing the wheel or disk 24 and is pivoted upon said plate eccentrically of the shaft 22. The dog 50 is provided with a projecting lug 51, adapted to be engaged by the pin 46, as hereinafter described, and with a pin 52, adapted to engage with the notches 26 of the flange 25 of the wheel or disk 24 when left free so to do by the operation of the parts hereinafter described.

53 indicates an expansion-spring which bears upon a suitable portion of the plate 47 at one end and at the other end against a projecting lug 54 on the dog 50 and tends normally and when free to operate to force the dog 50 upward in the direction of the arrow in Fig. 11 into the position shown in Fig. 8, so that the pin 52 may engage with one of the notches 26 of the flange 25.

The operation of the devices above described is as follows: When the planter is driven forward, the shaft 17 is rotated by the action of the wheel 16, rotating with it the sprocket-wheel 18, and by means of the sprocket-chain 19 the sprocket-wheel 20 also rotating the disk or wheel 24. As the parts are then normally in the position shown in Figs. 4, 5, 7, 9, and 11, the wheel or disk 24 rotates upon the bearing 21 without rotating the shaft 22. When one of the tappets or knots upon the check-rower wire 33 contacts the forked lever 32, it throws the forked lever 32 backward in the usual way, rocking the shaft 31 backward, expanding the spring 42. As the shaft 31 is rocked backward it carries the lever 36 backward with it, and the first operation is the engaging of the pin 46 with the lug 49, which throws the plate 47 slightly backward, giving to the shaft 22 a slight and quick backward rotation, carrying with it the seed-plate 27 and giving to the seed-plate a short backward rotation, the seed-plate having in its previous forward rotation, which is hereinafter described, gathered the grains of corn, either one at a time or in a charge of three or more grains, in the seed-cup 28. The seed-plate is thereupon by the mechanism and in the manner hereinafter described caused to rotate in a forward feeding direction, and the effect of the short backward rotation followed instantly by the forward feeding rotation, changing quickly from a movement in one direction to a movement in the opposite direction, will be to jar or shake the grain or grains of corn downward into the seed-orifices in proper position, so that they will not be engaged and sheared by the cut-off. As the plate 47 is carried backward, as above described, the pin 46 rides up the forward surface of the lug 49 and passes over it with the backward movement of the lever 36. At the same time the pin 46, riding up the forward surface of the dog 50, forces it backward and downward. The pin 46 by this backward movement of the lever 36 is thereby freed from engagement with the notch in the plate 47 and with the dog 50. The spring 53, being thereupon left free to operate, throws the dog 50 upward, so that the pin 52 engages with one of the notches 26 in the flange 25 of the wheel 24, and thus immediately upon the end of the backward movement of the seed-plate throws the two members of the clutch mechanism, consisting of the wheel 24, with its notched flange, and of the dog 50, into engagement, whereby the sprocket-wheel 20, being rotated, as was said above, by means of the chain 19, the sprocket-wheel 18, and the wheel 16, rotates the shaft 22, rotating with it the seed-plate 27, so as to feed the grains below the cut-off, which, being of the ordinary form and construction, is not shown, through any suitable opening into a seed-tube of any suitable form and description in position to be thence deposited in the ground in the usual manner. In the meantime the tappets on the check-rower wire 33 disengaging with the forked lever 32 the springs 42 and 43 return the rock-shaft 31 and lever 36 to their original position. As the wheel 26 is rotated, carrying with it the shaft 22 by the engagement of the clutch members, as above described, as soon as it has made one complete rotation the curved surface of the plate 47 engages with the pin 46 of the lever 44 upon the top of the lever 36, which, as above stated, is in its original position, and the pin 46, riding up the said curved surface, forces the forward arm of the lever 44 somewhat upward against the spring 45 as the plate 47 is rotated. When the pin 46, riding upward, as above described, comes to the notch 48, the pin 46 drops into the notch by the action of the spring 45 and bearing against the notch and the dog 50 throws the dog 50 backward and downward against the spring 53, disengaging the pin 52 from the notch, thus allowing the wheel or disk 24 to again freely rotate upon the bearing 21. By means of the rotation of the seed-plate 27 last above described the grains of corn which have been gathered in the seed-cups 28 are carried around below the cut-off. The seed-cups are so arranged and the relation of the gear-teeth upon the ring 29 with the gear-teeth on the beveled gear 30 is such that by means of the one complete rotation of the clutch members above described and of the shaft 22 the seed-plate is given a sufficient rotation to drop the desired number of grains of corn into the seed-tubes. By this rotation also the other seed-cups are filled with grains of corn ready to be carried around by the next rotation. With the next operation of the check-rower mechanism the operation above described is repeated, and, as was said above, the short and somewhat sharp reverse rotation of the seed-plate operates to shake or jar the grains of corn thus gathered into the seed-cups down into place in the seed-cups.

I have shown my invention in connection with a seed-plate having seed-cups adapted to receive only one grain of corn at a time, and this is the form in which I, as at present advised, prefer to embody my invention. I do not, however, confine myself to a corn-planter containing seed-cups of this description, as it is obvious that my invention might be equally well applied to seed-cups adapted to contain more than one grain of corn at a time, the amount of rotation given to the seed-plate of course being correspondingly varied. It is obvious also that the specific form of clutch mechanism and accompanying devices might be varied in some of the details without departing from the spirit of my invention, and I therefore do not confine myself to the construction shown, except as hereinafter claimed.

That which I claim as my invention, and desire to secure by Letters Patent, is—

1. In a corn-planter, the combination with the wheels of the rear frame and a check-row mechanism, of a seed-plate, means connected with said wheels, said check-row mechanism and said plate and adapted by the rotation of said wheels to impart to said plate a direct feeding rotation with each throw of the said check-row mechanism, and means operated by said check-row mechanism for imparting to said seed-plate a partial reverse rotation immediately preceding said direct feeding rotation, substantially as herein shown and described.

2. The combination with a corn-planter, wheels, check-rower mechanism, a seed-plate, a clutch member adapted to be rotated by the rotation of said wheels, and a second clutch member connected with said seed-plate and adapted to be thrown into engagement with said first clutch member by the throw of the check-rower mechanism and thereby give to said seed-plate an intermittent, direct feeding rotation, of mechanism operated by the throw of the check-rower mechanism to give to said seed-plate a partial reverse rotation preceding its direct feeding rotation, substantially as described.

3. The combination with a corn-planter having wheels, and check-rower mechanism, a seedbox, and a seed-plate rotatably mounted in said seedbox, of a seed-plate-driving shaft adapted by its rotation to rotate said seed-plate, a clutch member rotatably mounted on said seed-plate-driving shaft and rotated by the rotation of said wheel, a second clutch member secured to said seed-plate-driving shaft, a check-rower shaft adapted to be rocked by said check-rower mechanism, a lever secured to said check-rower shaft and adapted, upon the rocking of said check-rower shaft by the throw of said check-rower mechanism, to engage said second clutch member and throw it into operative engagement with said first clutch member and thereby rotate the said seed-plate-driving shaft, and an arm secured to said seed-plate-driving shaft and adapted to be engaged by said lever at each throw of the check-rower mechanism and give to said shaft a short backward rotation preceding the engagement of said clutch members, whereby said seed-plate will be given a partial reverse rotation immediately preceding its direct, feeding rotation, substantially as described.

JOHN C. TUNNICLIFF.

Witnesses:
J. H. SAMUELS,
ELMER E. MORGAN.